(12) United States Patent
Hyers et al.

(10) Patent No.: US 11,591,704 B2
(45) Date of Patent: Feb. 28, 2023

(54) ELECTROLYTIC PRODUCTION OF REACTIVE METALS

(71) Applicant: Boston Electrometallurgical Corporation, Woburn, MA (US)

(72) Inventors: Robert W. Hyers, Winchester, MA (US); James A. Yurko, Maumee, OH (US); Donald R. Sadoway, Cambridge, MA (US)

(73) Assignee: Boston Electrometallurgical Corporation, Woburn, MA (US)

( * ) Notice: Subject to any disclaimer, the term of this patent is extended or adjusted under 35 U.S.C. 154(b) by 0 days.

(21) Appl. No.: 16/635,508

(22) PCT Filed: Jul. 31, 2018

(86) PCT No.: PCT/US2018/044542
§ 371 (c)(1),
(2) Date: Jan. 30, 2020

(87) PCT Pub. No.: WO2019/027978
PCT Pub. Date: Feb. 7, 2019

(65) Prior Publication Data
US 2020/0248326 A1    Aug. 6, 2020

Related U.S. Application Data

(60) Provisional application No. 62/539,666, filed on Aug. 1, 2017.

(51) Int. Cl.
*C25C 7/02* (2006.01)
*C25C 3/34* (2006.01)
(Continued)

(52) U.S. Cl.
CPC ............... *C25C 3/34* (2013.01); *C25C 7/005* (2013.01); *C25C 7/06* (2013.01)

(58) Field of Classification Search
CPC .. C25C 3/34; C25C 3/00; C25C 7/005; C25C 7/06; C25C 7/00; C25C 1/00; C25C 7/007; C25C 7/02
See application file for complete search history.

(56) References Cited

U.S. PATENT DOCUMENTS

2007/0215483 A1    9/2007  Johansen et al.
2010/0314260 A1   12/2010  Fujita et al.
(Continued)

FOREIGN PATENT DOCUMENTS

WO    2013/170310 A1    11/2013

OTHER PUBLICATIONS

Allanore; "Features and Challenges of Molten Oxide Electrolytes for Metal Extraction"; J.Electrochem. Soc. vol. 162 No. 1 E13-E22; Nov. 25, 2014.
(Continued)

*Primary Examiner* — Zulmariam Mendez
(74) *Attorney, Agent, or Firm* — Kilpatrick Townsend & Stockton LLP

(57) ABSTRACT

A method of and system for electrolytic production of reactive metals is presented. The method includes providing a molten oxide electrolytic cell including a container, an anode, and a current collector and disposing a molten oxide electrolyte within the container and in ion conducting contact with the anode and the current collector. The electrolyte includes a mixture of at least one alkaline earth oxide and at least one rare earth oxide. The method also includes providing a metal oxide feedstock including at least one target metal species into the molten oxide electrolyte and applying a current between the anode and the current collector, thereby reducing the target metal species to form at least one molten target metal in the container.

18 Claims, 4 Drawing Sheets

(51) Int. Cl.
*C25C 7/00* (2006.01)
*C25C 7/06* (2006.01)

(56) References Cited

U.S. PATENT DOCUMENTS

2012/0292198 A1  11/2012  Derezinski
2013/0153434 A1   6/2013  Allanore et al.

OTHER PUBLICATIONS

PCT/US2018/044542 received an International Search Report and Written Opinion dated Oct. 3, 2018, 8 pages.

ELECTROLYTIC PRODUCTION OF REACTIVE METALS

BACKGROUND OF THE INVENTION

Field of Invention

This invention generally relates to electrolytic production of metals and, more specifically, to the use of specific electrolytes and process conditions for the electrolytic production of relatively highly reactive metals.

Description of Related Art

Molten oxide electrolysis (MOE) is a process that produces molten metal from a metal oxide feedstock. MOE calls for dissolving a solid oxide feed in a molten electrolyte and reducing the metal oxide to the target metal. An apparatus for conducting the MOE process is illustrated in FIG. 1.

FIG. 1 shows an anode in electrical contact with a molten oxide electrolyte, in which a metal oxide is dissolved. In the embodiment illustrated, the shell of the electrolysis cell is conductive and is in electrical contact with a current collector bar. However, the shell need not be conductive, and the current collector bar can be in contact with the molten metal described below. Passage of current between the anode and collector bar reduces the metallic species of the metal oxide and produces a molten metal product that collects on the cell floor. This molten metal product forms a "liquid cathode". The electrolysis reactions also causes the oxide ions to form carbon monoxide at the carbon anode. The current also causes resistive heating that provides the excess enthalpy of the reduction and balances the heat flow from the cell. The corrosive electrolyte mixture is contained by a frozen electrolyte ledge, which protects the shell of the MOE cell.

MOE has been demonstrated for a number of relatively less reactive metals, and one relatively more reactive metal, titanium. However, known MOE processes and known molten oxide electrolytes are generally unsuitable for recovering relatively more reactive metals, such as rare earth metals. It has been shown that relatively more relatively metals can be produced using electrolysis of fluoride or chloride melts to extract reactive metals from oxides, fluorides, or chlorides.

Rare earth metals occur together in nature, so a separation step is needed first. This separation step produces the rare earth metals as pure oxides or specific oxide mixtures, which then may be extracted to form metals or alloys. Under known extraction methods, these oxides are often converted to fluorides or chlorides, and then those compounds are reduced to metal. The conversion step is accomplished by reaction of the oxide with carbon and fluorine or chlorine gas. The byproducts of this step include polyfluorinated carbon compounds (PFCs), dioxins, and furans.

The next step to produce the rare earth metal or alloy is either calciothermic reduction or oxy-fluoride electrolysis. In calciothermic reduction, the rare earth fluoride or chloride is reduced by metallic calcium, producing calcium fluoride or chloride, respectively. That step is straightforward, but the production of the calcium metal is energy intensive and involves more steps, expensive capital equipment, and harmful emissions.

In oxy-fluoride electrolysis, rare earth oxide, sometimes with rare earth fluoride, is dissolved in a molten salt such as lithium fluoride. The passage of current through this mixture from a carbon anode to a metal cathode produces rare earth metal and carbon monoxide. However, again, significant amounts of PFCs and hydrofluoric acid are produced as byproducts, requiring expensive gas treatment to control emissions.

BRIEF SUMMARY OF THE INVENTION

Under an aspect of the invention, a method of and system for electrolytic production of reactive metals is disclosed.

Under another aspect of the invention, a method includes providing a molten oxide electrolytic cell including a container, an anode, and a current collector and disposing a molten oxide electrolyte within the container and in ion conducting contact with the anode and the current collector. The electrolyte comprises a mixture of at least one alkaline earth oxide and at least one rare earth oxide. The method also includes providing a metal oxide feedstock comprising at least one target metal species into the molten oxide electrolyte and applying a current between the anode and the current collector, thereby reducing the target metal species to form at least one molten target metal in the container. The method further includes removing at least a portion of the molten target metal from the container.

Under a further aspect of the invention, a method includes providing a molten oxide electrolytic cell including a container, an anode, and a current collector and disposing a molten oxide electrolyte within the container and in ion conducting contact with the anode and the current collector. The electrolyte comprises about 30% to about 50% beryllium oxide, 0% to about 85% lanthanum oxide, 0% to about 85% cerium oxide, with the balance being calcium oxide. The method also includes providing a metallic species feedstock of at least one of an oxide of titanium, zirconium, and hafnium into the molten oxide electrolyte and applying a current between the anode and the current collector, thereby reducing the metallic species to form at least one molten target metal in the container. The method further includes removing at least a portion of the molten target metal from the container.

Under yet another aspect of the invention, the metallic species feedstock is provided into the molten oxide electrolyte at about 5% to about 25%.

Under another aspect of the invention, the target metal comprises an alloy, the alloy comprising the target metal and at least one of titanium, zirconium, and hafnium and at least one of iron, copper, nickel, aluminum, zirconium, and titanium.

Any of the aspects and embodiments described herein can be combined with any of the other aspects and embodiments set forth herein.

These and other features will become readily apparent from the following detailed description wherein embodiments of the invention are shown and described by way of illustration.

BRIEF DESCRIPTION OF THE SEVERAL VIEWS OF THE DRAWINGS

For a more complete understanding of various embodiments of the present invention, reference is now made to the following descriptions taken in connection with the accompanying drawings in which.

DETAILED DESCRIPTION

Figure 1:
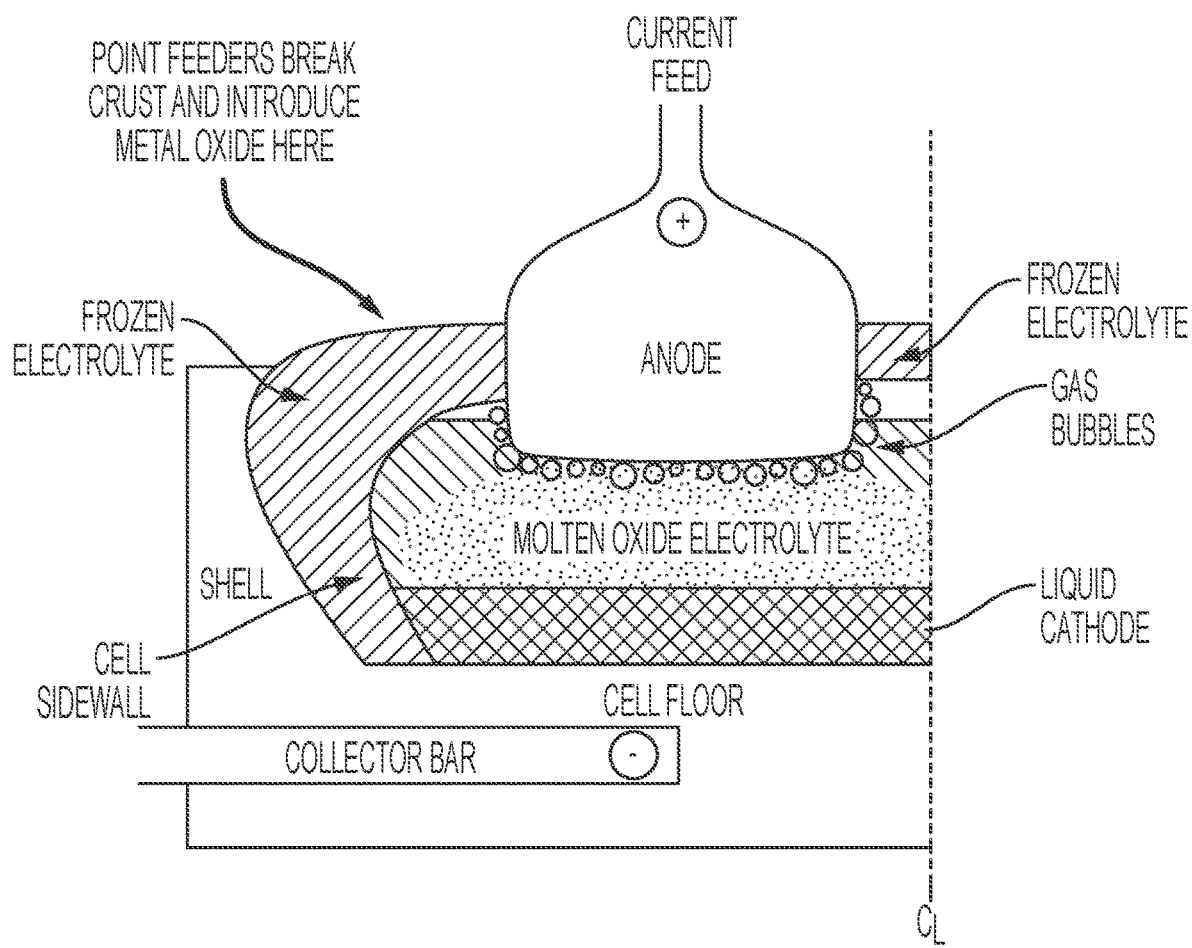
FIG. 1 illustrates a cross-sectional schematic of a prior art molten oxide electrolysis cell.

Preferred embodiments of the invention include methods of and systems for electrolytic production of relatively more reactive metals. As used herein, relatively more reactive metals are those that are more reactive (having a higher affinity for oxygen) than silicon on an Ellingham diagram, while relatively less reactive metals are those that are less reactive that silicon, i.e., having a Gibbs free energy of oxidation more negative than approximately 180 kJ/mol O$_2$ consumed at 400° C., becoming less negative by approximately 45 kJ/mol O$_2$ consumed for each ° C. higher temperature. As set forth above, known MOE processes and electrolytes are generally unsuitable for use with relatively more reactive metals. As one moves along a spectrum of reactivity of the target metals from lower to higher, the set of oxides available to create a supporting electrolyte grows progressively smaller because the supporting electrolyte should, in some embodiments, be more stable in its oxidized state than the target metal. For the metals titanium and zirconium, CaO—BeO is sufficiently stable. However, for producing beryllium or rare earths, a relatively more stable supporting electrolyte is needed. Advantageously, the same family of highly-stable electrolytes that can be used for producing beryllium or rare earths can be used in place of CaO—BeO in processes for producing other relatively more reactive metals (e.g., titanium and zirconium). Doing so reduces the operating cost and health and safety issues associated with the use of CaO—BeO.

In an illustrative implementation of the invention, a family of electrolytes used for MOE production of relatively more reactive metals includes AO-RO$_x$ mixtures, in which AO is one or more of the alkaline earth oxides (BeO, CaO, MgO, SrO, and BaO), and RO$_x$ is one or more of the rare earth oxides (oxides of Sc, Y, La, Ce, Pr, Nd, Pm, Sm, Eu, Gd, Tb, Dy, Ho, Er, Tm, and Yb). The proportions of the oxides included in the electrolyte mixtures are chosen to match the necessary physical and chemical properties for extraction of the target metal by MOE. The physical properties include that the electrolyte is less dense than the target metal (or target alloy, when the target metal is reduced into a host alloy). In some embodiments, the density difference is at least about 0.2 g/cm$^3$, but other values are within the scope of the invention, with larger values being more favorable. In addition, in some embodiments, the electrolytes should have primarily ionic conduction: the electron transference number should be high enough to provide economically-viable current efficiency. In some embodiments, the electrolyte is in a molten state at the operating temperature of the cell without the target metal species dissolved therein (with the exception of portions of frozen electrolyte, described below.)

In some embodiments, the electrolyte also keeps the chemical activities of the non-target components low enough that the target metal is extracted with acceptable levels of co-deposition of other elements. For low-value-add metals like Ti, the acceptable levels of other elements may be very low, while for higher-value-add metals like Dy, a large amount of some elements like Ca can be easily tolerated in the extraction process, and removed later by distillation. Extraction into a host alloy will further shift the selectivity of the reaction, and may also be required to maintain density stratification in the MOE cell. Maintaining density stratification in the MOE cell, with the target metal at the lowest layer, reduces contact between the target metal and oxygen produced during the production process. This in turn reduces back-reactions between the metal and oxygen that would otherwise form oxides of the target metal and reduce operating efficiency. Sometimes the host alloy will make a master alloy that is itself of commercial importance (e.g., Cu—Be, Ni—Be, Al—Be, Zr—Be, Cu—Fe—Be, Fe—Nd, and Fe—Dy), while other times the host is an intermediate state of the separation (e.g., Ca—Dy and Fe—Dy), and the alloy is then processed using other separation techniques (e.g., distillation).

In one or more embodiments a frozen ledge of electrolyte is maintained to prevent chemical attack of the container by the molten electrolyte. The composition of the frozen ledge will be determined by the composition of the electrolyte and the relevant phase diagram. In some cases, e.g., with the rare earths, it is advantageous to maintain the target metal's oxide at saturation in the electrolyte. In that case, the frozen ledge will also be composed primarily of the target metal's oxide. In other cases, it will be advantageous to maintain a different primary phase, such as CaO or a compound such as CaTiO$_3$. While a higher current efficiency is obtained with the concentration of solute well below saturation, for highly reactive metals, certain implementations have a saturated solution to gain purity at the price of efficiency.

Optionally, a small amount (less than about 5%) of fluoride is added to the oxide mixture to reduce its melting point without significantly affecting the chemistry of the metal production process or introducing undesirable environmental impacts. By keeping the fluoride below the about 5% level, the electrolyte and dissolve metal oxide(s) of the target metal(s) still behave as an oxide melt rather than an oxyfluoride complex. Unless otherwise stated or evident from the usage in context, percentages used herein are weight percentages.

In one or more embodiments, the solvent contains a mixture of two or more of the oxides of Be, Ca, Mg, Sr, and Ba.

Figure 4:
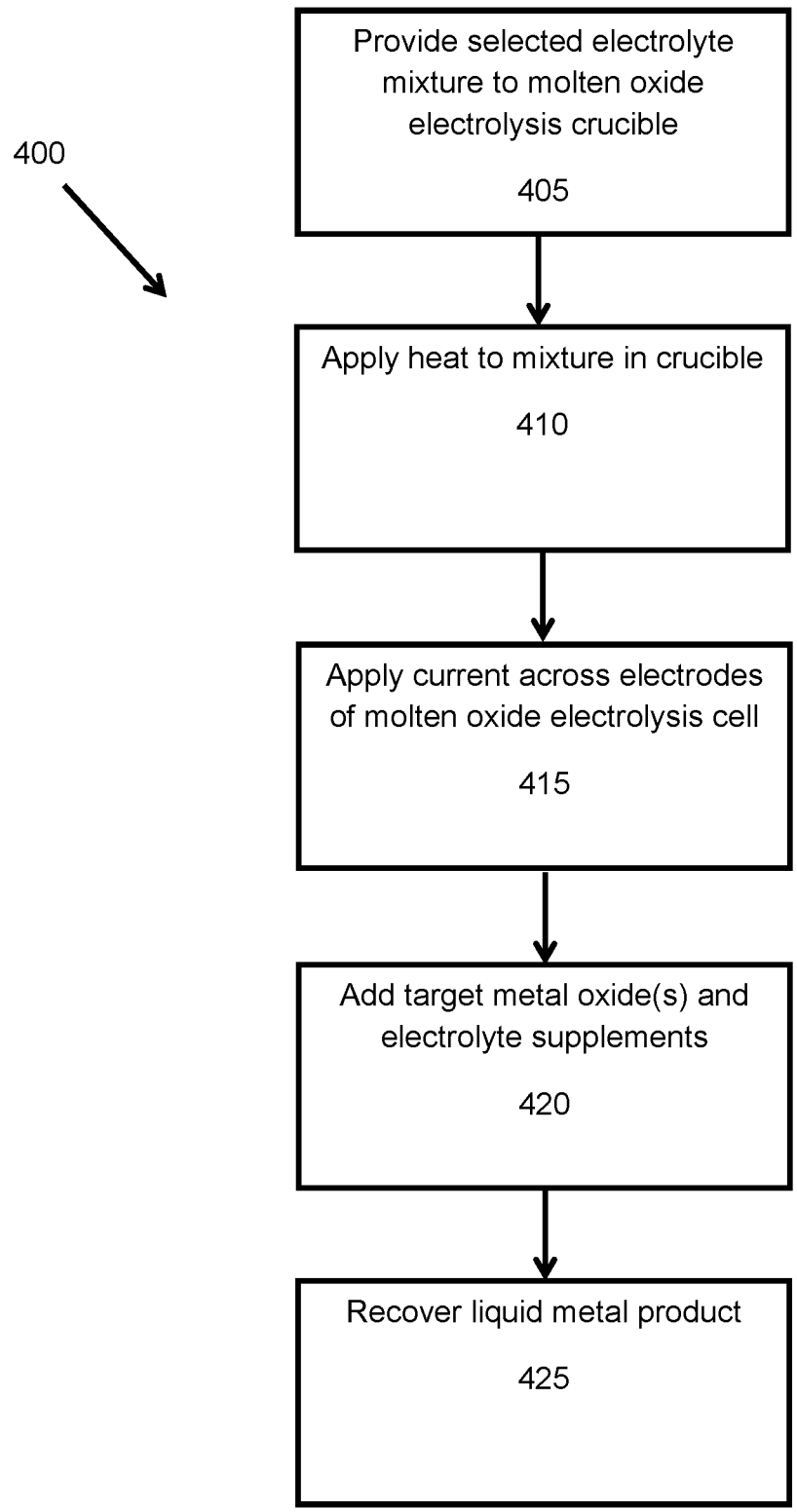
FIG. 4 is an overview of the operation of a molten oxide electrolysis cell according to an aspect of the invention.

FIG. 4 is an overview of a process 400 for operating a molten oxide electrolysis cell according to an aspect of the invention. The process includes providing a selected electrolyte mixture to the crucible of the MOE cell (step 405) and applying heat to the mixture in order to liquefy at least a portion of the mixture (step 410). Heat may be applied in any manner known in the art, including, but not limited to external heaters in or in contact with the crucible wall and/or via resistive heating of the mixtures themselves. Optionally, the electrolyte mixture can be heated in a separate vessel and transferred to the crucible. Next, an electric current is applied across the electrodes of the MOE cell (e.g., an anode and cathode) (step 415) to reduce the one or more desired metal species, which then collects on the floor of the crucible.

During the operation of the MOE cell, additional target metal(s), in the form of metal oxide(s), are added to the electrolyte mixture (step 420), optionally, any electrolyte supplements needed to maintain the concentrations of the various components in the electrolyte mixture are added as well. Finally, the molten metal product that has collected in the MOE cell is recovered (step 425). In the implementations that use a host metal to recover the target metal species, additional host metal is added after recovery of the molten metal product. When the MOE cell is operating at or above the melting temperature of the added host metal, the host metal will melt and pool on the floor of the MOE cell. In contrast, if the MOE cell is operating below the melting temperature of the host metal, but above the melting temperature of the host metal/target metal alloy, the additional host metal will melt upon formation of the host alloy compound.

Example 1—Production of Neodymium Metal and Neodymium-Iron Master Alloy

In one embodiment of the invention, a method of producing substantially pure neodymium from $Nd_2O_3$ feedstock includes operating an MOE cell using a CaO—BeO—Nd2O3 electrolyte. The mixture composition is close to the eutectic composition of CaO—BeO (approximately 38 wt % BeO) and $Nd_2O_3$ is kept close to saturation. Running the cell with $Nd_2O_3$ near saturation is contrary to the conventional practice of maintaining the target metal at relativity low concentrations. Doing so maintains the chemical activity of Nd several orders of magnitude above that of Be. This aids in minimizing the co-reduction of Be and Nd.

Figure 2:
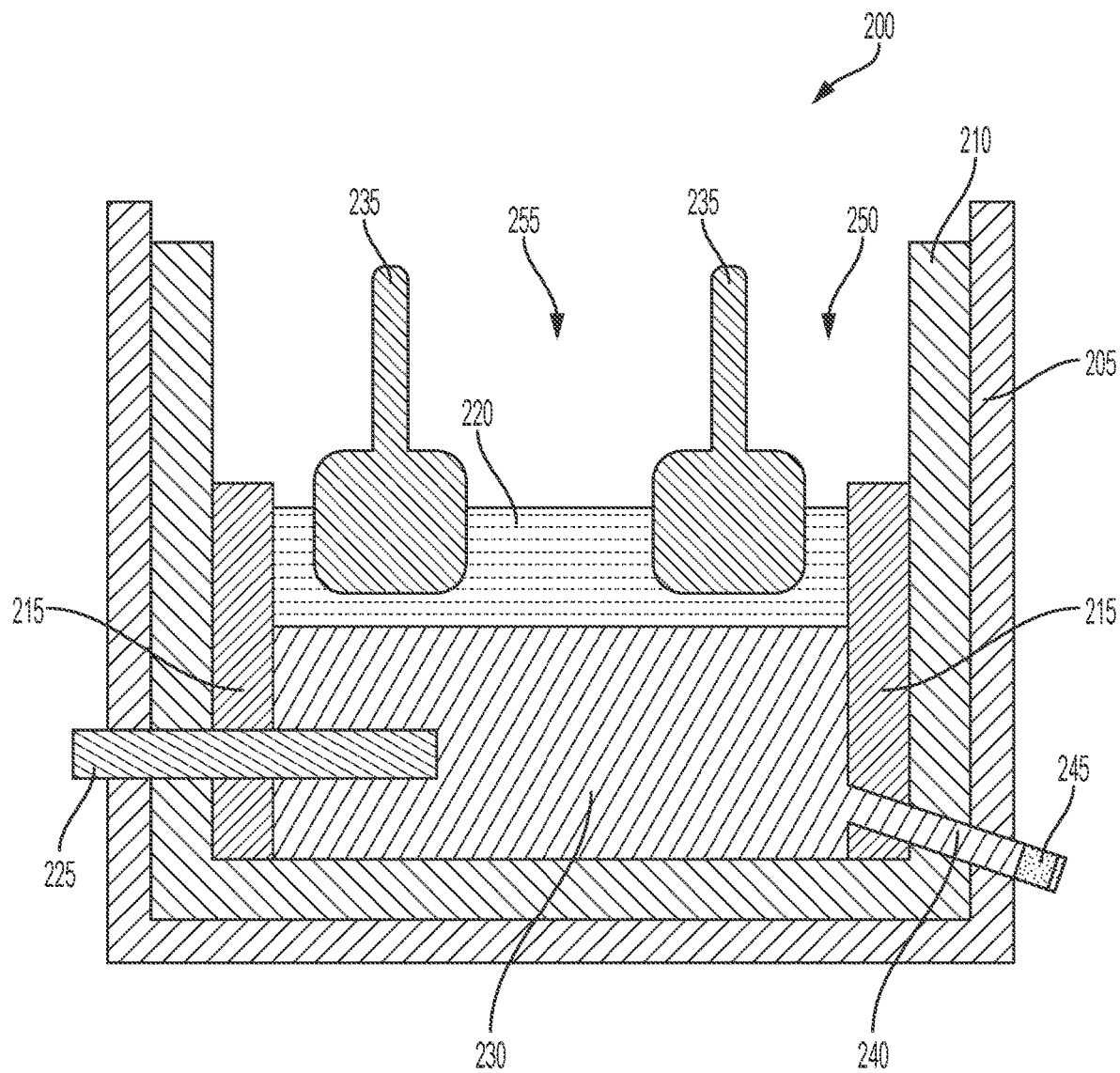
FIG. 2 illustrates a cross-sectional schematic of a molten oxide electrolysis cell according to an aspect of the invention.

FIG. 2 illustrates a cross-sectional schematic of a molten oxide electrolysis cell 200 according to an aspect of the invention. Cell 200 includes a molybdenum crucible 205 with a thermal and electrical insulation layer 210. Cell 200 has a current collector 225 that directly contacts a molten metal layer 230. In some embodiments, the current collector 225 has a combination of chemical and thermal properties such that it can survive contact with the molten product and still maintain contact outside the cell to close the electrical circuit. Known techniques include the use of a refractory metal or electrically conductive ceramic. The current collector 225 is cooled via gas or liquid cooling techniques known in the art. The molten metal layer 230, which is the metal or alloy product produced by the process, acts as a liquid cathode. Cell 200 also includes one or more anodes 235, constructed of carbon or any other suitable material. A hot tap 240, sealed by a clay plug 245, is used to remove the molten metal product 230.

The cell 200 operates with a frozen ledge 215. The frozen ledge may extend completely to the bottom of the molten metal layer 230, as shown in FIG. 2, not at all below the metal-electrolyte interface, or somewhere in between. The extent of the frozen ledge 215 is determined by the physical and chemical properties of the molten metal, liquid and solid electrolyte, and insulation layer 210. The frozen ledge 215 is achieved by balancing the heat loss through the side of the cell 200 with the properties of the electrolyte to maintain the necessary temperature gradient. First, the temperature of the electrolyte is below the liquidus at some distance inside the wall of the reactor. This distance is the thickness of the frozen ledge 215. Second, at steady-state, the heat flux into the frozen ledge 215 from the molten electrolyte 220 balances the heat conducted through the frozen ledge 215 of the crucible 205. Removal of too much heat is avoided in order to prevent freezing the entire cell. Likewise, removal of too little heat and the production of too much heat is avoided to prevent the ledge 215 from melting completely as the heat lost through the ledge 215 is insufficient to maintain the liquidus isotherm of the electrolyte within the cell.

In between these extremes, there exists a finite range of operational parameters for which a stable frozen ledge 215 exists. This range of parameters is determined by the geometry of the cell 200 and the properties of the electrolyte 220, side wall 215, and insulation 210. Operational parameters include:

Joule heating (I2R) in the cell, determined by the overall current, its distribution, and the anode-cathode distance;

Rate of gas evolution on the anode, determined by the current; and

Immersion depth of the anode, determined by the electrolyte depth and the anode-cathode distance.

The feasible range for the operational parameters depends, at least in part, on accounting for variability in the properties of the electrolyte 220 and insulation 210. The heat transfer within the molten electrolyte 220 and from the molten to frozen electrolyte 215, in part, determines the thermal design of the ledge. The thermal design of the top and bottom of the cell is arranged to balance the remainder of the Joule heating in the electrolyte. The oxygen content, temperature, and mass flow of the gas evolved from the cell is measured and contributes to the determination of heat loss from the cell.

The cell 200 is operated in much the same manner as set forth in the description preceding this example. The operating temperature range is as low as possible while still remaining above the greater of the melting points of Nd (1024° C.) and the electrolyte (about 1400° C.). In this case, the electrolyte determines the minimum operating temperature. The technologically and economically useful Nd—Fe alloys likewise melt before the electrolyte. Running at higher temperatures remains within the scope of the invention. However, doing so encounters greater thermal losses. Feedstock of Nd2O3 is fed into the top of the electrolyte 220 in the region 250 between the anode(s) 235 and insulation layer 210. Optionally, or in addition, the feedstock is fed in the region 255 between the anode(s) 235. Crust breakers/feeders known in the art are used for this purpose.

In another illustrative implementation, a method of reducing Nd into an iron host, thereby producing a Nd—Fe solution with a lower chemical activity of Nd, uses a cell and electrolyte similar to that set forth immediately above. The cell is initially charged with iron, optionally supplemented with Nd metal, or Fe—Nd alloy. The iron in the host may be replenished after tapping the product, supplied continuously or periodically, as in the oxide feed. Advantageously, the reduced activity of the rare earth in the alloy favors reduction and prevents reoxidation.

Neodymium-Iron-Boron magnets are a critical part of many clean energy technologies, including electric vehicles. They have large potential advantages in wind turbine generators as well, but the supply of these materials is insufficient to address a significant fraction of the wind energy market, even without current geopolitical supply-chain issues. Ironically, current extraction methods for this critical clean energy material are often described as inefficient, environmentally unfriendly, and unsustainable.

Producing neodymium metal according to the processes proposed herein introduces a fundamentally cleaner and more efficient processes than existing practice, improving the extraction and processing of this critical rare earth element. The MOE processes set forth herein uses oxide feedstock directly, removing the expensive and environmentally unfriendly steps of carbochlorination/carbofluorination from conventional extraction, saving the expense of these steps and the expense of capturing and cleaning the resulting emissions. The present MOE processes eliminate fluorine and chlorine both from the intermediates and from the extraction process itself, thereby eliminating the related emissions as well. The advantages of the disclosed MOE processes are summarized in Table 1.

TABLE 1

Comparison of MOE and metallothermic production of rare earths

| MOE Rare-Earth Production | Current Metallothermic Rare-Earth Production |
|---|---|
| Estimated at <5 kWh/kg | >10 kWh/kg |
| Continuous, single-step production of a molten product | Batch, multi-step production of a solid-product |
| No carbochlorination necessary—more environmentally safe | Requires carbochlorination—can lead to hazardous dioxin and furan by-products |
| Custom tailored rare-earth alloys can be produced within the MOE flex reactor—allows for the production of alloys specific to an application. | Limited to pure rare earth metal production |

Example 2—Production of Titanium, Zirconium, and Hafnium

In one embodiment of the invention, a method of producing substantially pure titanium, zirconium, or hafnium from a feedstock of the metal's corresponding oxide includes operating an MOE cell using a CaO—BeO supporting electrolyte. The mixture composition is in the range of about 30% to about 50% BeO. The exact ratio is selected to simplify maintenance of the frozen ledge and to control the primary phase. Optionally, a portion of the BeO is replaced with one or both of CeO2 and La2O3, as described in Example 4 in connection with FIG. 3. The target metal oxide is added to about 5% to about 25% of the total electrolyte mixture.

The cell is operated in much the same manner as set forth in the example and general description above. In this example, when producing the pure elements, the cell temperature is maintained above the melting points, 1668° C. for titanium, 1855° C. for zirconium, and 2233° C. hafnium, to produce the metal as a liquid. Unlike the previous example, the operating temperature is determined by the melting point of the product, not that of the supporting electrolyte.

In an alternative implementation of this illustrative embodiment, a host metal, such as copper or nickel, is employed into which titanium, zirconium, or hafnium is reduced. For example, in the case of a Cu—Zr alloy, copper is provided into the MOE cell and forms molten copper metal on the floor of the cell. In such a case, the higher of the melting points of the alloy and the electrolyte determine the operating temperature of the cell. Optionally, the cell may be operated at an even higher temperature; for example, above the melting point of the host metal.

Example 3—Production of Beryllium

In one embodiment of the invention, a method of producing substantially pure beryllium from a feedstock of BeO includes operating an MOE cell using an electrolyte containing a mixture of at least three of $CeO_2$, $La_2O_3$, SrO, BaO, BeO, MgO, and CaO. In one implementation, the electrolyte contains about 10% to about 30% $CeO_2$, about 10% to about 20% BeO, with the balance being CaO. In another implementation, the electrolyte contains about 10% to about 30% $CeO_2$, about 10% to about 30% $La_2O_3$, about 10% to about 20% BeO, with the balance being CaO. In a further implementation, the electrolyte contains about 10% to about 30% $CeO_2$, about 10% to about 30% $La_2O_3$, about 10% to about 30% SrO, about 10% to about 20% BeO, with the balance being CaO. Obviously in the later implementation, the concentration of each oxide cannot be at the top of the stated range so the total composition equals 100%.

Beryllium is reduced first from the electrolyte compositions stated above during operation of the cell, and BeO is fed into the electrolyte mixture during operation of the cell to maintain its concentration close to the initial BeO concentration of the electrolyte. Optionally, the BeO is fed into the cell to maintain the BeO concentration near saturation.

In an alternative implementation of the Be production, a host metal, such as copper or nickel, is employed into which Be is reduced.

In either implementation, the cell is operated in much the same manner as set forth in the example and general description above. Pure Be melts at 1287° C., while desirable Be alloys melt at various temperatures from well below 1000° C. to over 1400° C. As with the other examples, the higher of the melting points of the metal and the electrolyte determine the operating temperature of the cell. Optionally, the cell may be operated at an even higher temperature; for example, above the melting point of the host metal.

Example 4—Production of Beryllium

Figure 3:
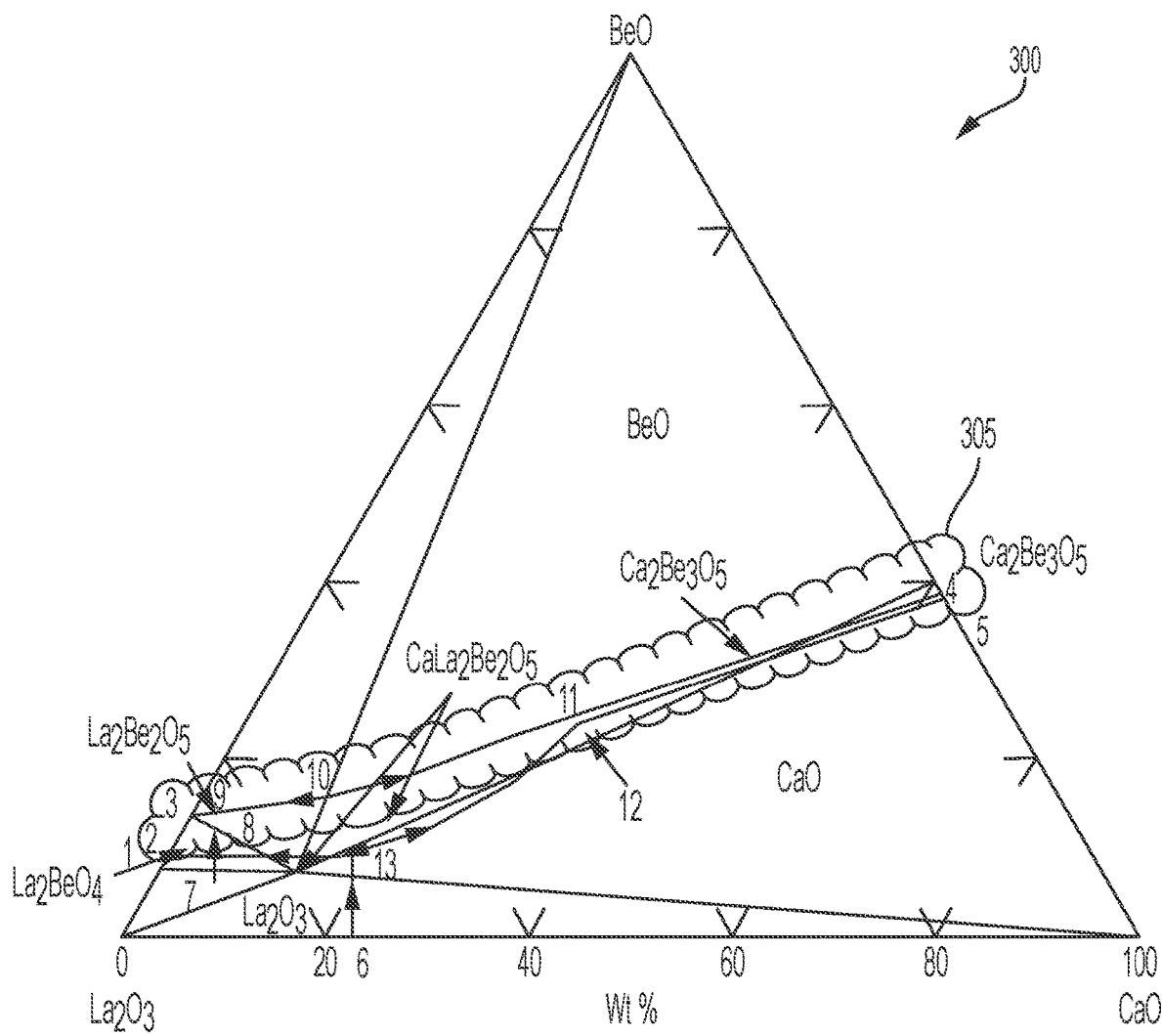
FIG. 3 is a ternary phase diagram for the CaO—BeO—La$_2$O$_3$ system according to an aspect of the invention.

In one embodiment of the invention, a method of producing substantially pure beryllium from a feedstock of BeO includes operating an MOE cell using an electrolyte that includes at least two of CaO, BeO, $La_2O_3$, and $CeO_2$. FIG. 3 is a ternary phase diagram 300 for the CaO—BeO—$La_2O_3$ system. Appropriate concentrations of the oxides for use in the method of this example exist along curve portion 305 of the relative concentration curves. Curve portion 305 starts at about 85% $La_2O_3$-15% BeO, through about 40% $La_2O_3$-25% BeO-35% CaO, to the CaO—BeO eutectic at about 40% BeO-60% CaO.

In an alternative implementation, any portion of the $La_2O_3$ is replaced with $CeO_2$. In addition, the relative concentrations of the oxides along curve portion 305 are limited to those with relatively low liquidus temperature variability as a function of the Be concentration. For example, while the region around invariant point 13 of FIG. 3 is too hot, the region from points 2, 3, 9, 10, 11, 4, and 5 remain in the range of about 1300-1400 degrees C., which are suitable.

In any of the implementations, the cell is operated in much the same manner as set forth in the example and general description above. The operating conditions are the same as in Example 3, above, except that the melting temperature of the electrolyte varies as the composition is changed through the range detailed below. As in the previous example, beryllium is reduced first from the electrolyte compositions stated above during operation of the cell, and BeO is fed into the electrolyte mixture during operation of the cell to maintain its concentration close to the initial BeO concentration of the electrolyte. Optionally, the BeO is fed into the cell to maintain the BeO concentration near saturation.

Example 5—Production of Rare Earth Metals

In one embodiment of the invention, a method of producing a substantially pure rare earth metal from a feedstock of its corresponding rare earth metal oxide includes operating an MOE cell using any of the supporting electrolyte compositions set forth in Example 3. The electrolyte composition is changed in detail to control the primary phase in order to control the composition of the frozen ledge. The rare earth oxide is fed into the electrolyte mixture during operation of the cell to maintain the rare earth oxide concentration near saturation.

In either implementation, the cell is operated in much the same manner as set forth in the example and general description above. The melting points of the pure rare earth metals vary from approximately 820° C. to approximately 1550° C., with most of the desirable alloys also within this range. For each case, the operating temperature will at least the greater of the melting point of the product and that of the electrolyte.

Further still, the processes described herein are suitable for in-situ alloying. For example, to produce a Nd—Fe—B alloy, boron metal or an Fe—B alloy is added to a host metal. Nd would be reduced into the host metal to produce the desired alloy. Alternatively, $B_2O_3$ is added to the electrolyte, which would react with Nd in the alloy to form B and $Nd_2O_3$, which would be reduced into the final alloy during production.

Example 6—Production of Rare Earth Metals

In one embodiment of the invention, a method of producing a substantially pure rare earth metal from a feedstock of its corresponding rare earth metal oxide includes operating an MOE cell using a supporting electrolyte of at least two of CaO, BeO, $La_2O_3$, and $CeO_2$ in relative concentrations that exist along curve portion 305 of FIG. 3, to which an oxide of a target rare earth metal is added. In a specific implementation, the supporting electrolyte includes about 40% $La_2O_3$-25% BeO-35% CaO, to which the rare earth oxide is added to achieve saturation of the rare earth oxide.

In any of the implementations, the cell is operated in much the same manner as set forth in the example and general description above, with the specific operating parameters being similar to those in Example 5. The rare earth is reduced first from the electrolyte compositions stated above during operation of the cell, and more of the rare earth oxide is fed into the electrolyte mixture during operation of the cell to maintain its concentration close to its initial concentration of the electrolyte. Optionally, the rare earth oxide is fed into the cell to maintain the its concentration near saturation.

It will be appreciated that the scope of the present invention is not limited to the above-described embodiments, but rather is defined by the appended claims, and these claims will encompass modifications of and improvements to what has been described. As used herein, the term "about" means an amount that can vary 10% from the stated value.

What is claimed is:

1. A method comprising:
providing a molten oxide electrolytic cell including a container, an anode, and a current collector;
disposing a molten oxide electrolyte within the container and in ion conducting contact with the anode and the current collector, wherein the electrolyte comprises a mixture of at least one alkaline earth oxide and at least one rare earth oxide;
providing a metal oxide feedstock comprising at least one target metal species into the molten oxide electrolyte;
applying a current between the anode and the current collector, thereby reducing the target metal species to form at least one molten target metal in the container; and
removing at least a portion of the molten target metal from the container, wherein the molten target metal comprises a rare earth metal or beryllium.

2. The method of claim 1, wherein the at least one alkaline earth oxide includes at least one of beryllium oxide, calcium oxide, magnesium oxide, strontium oxide, and barium oxide.

3. The method of claim 1, wherein the at least one rare earth oxide includes at least one of scandium oxide, yttrium oxide, lanthanum oxide, cerium oxide, praseodymium oxide, neodymium oxide, promethium oxide, samarium oxide, europium oxide, gadolinium oxide, terbium oxide, dysprosium oxide, holmium oxide, erbium oxide, thulium oxide, and ytterbium oxide.

4. The method of claim 1, wherein the metal oxide feedstock includes the rare earth metal, and the metal oxide feedstock is provided into the molten oxide electrolyte at the saturation concentration of the metal oxide feedstock.

5. The method of claim 1, wherein the at least one molten target metal comprises a rare earth metal alloy, the alloy comprising a rare earth metal and at least one of iron, copper, nickel, aluminum, zirconium, and titanium.

6. The method of claim 1, wherein the at least one molten target metal comprises at least one of copper-beryllium, nickel-beryllium, aluminum-beryllium, zirconium-beryllium, and copper-iron-beryllium.

7. The method of claim 1, wherein the target metal is neodymium and the electrolyte comprises calcium oxide, beryllium oxide, and neodymium oxide, and further wherein the calcium oxide and the beryllium oxide are in a ratio at approximately their eutectic composition and neodymium oxide is at a concentration of about its saturation in the calcium oxide and beryllium oxide mixture.

8. The method of claim 1, wherein the electrolyte comprises at least three of cerium oxide, lanthanum oxide, strontium oxide, barium oxide, beryllium oxide, magnesium oxide, and calcium oxide.

9. The method of claim 8, wherein the electrolyte comprises about 10% to about 30% cerium oxide and about 10% to about 20% beryllium oxide with the balance being calcium oxide.

10. The method of claim 8, wherein the electrolyte comprises about 10% to about 30% cerium oxide, about 10% to about 30% lanthanum oxide, and about 10% to about 20% beryllium oxide with the balance being calcium oxide.

11. The method of claim 8, wherein the target metal is beryllium and the metal oxide feedstock includes beryllium oxide, and wherein the beryllium oxide feedstock is provided into the molten oxide electrolyte to maintain the beryllium oxide concentration in the molten electrolyte.

12. The method of claim 8, wherein the target metal includes a rare earth metal and the metal oxide feedstock includes a rare earth metal oxide, and wherein the rare earth metal oxide feedstock is provided into the molten oxide electrolyte to maintain the rare earth metal oxide near its saturation concentration in the molten oxide electrolyte.

13. The method of claim 1, wherein the target metal is beryllium and wherein the electrolyte comprises 0% to about 85% lanthanum oxide, about 0% to about 85% cerium oxide, about 15% to about 40% beryllium oxide, and 0% to about 60% calcium oxide.

14. The method of claim 1, wherein the target metal includes a rare earth metal and the metal oxide feedstock includes a rare earth metal oxide, and wherein the electrolyte includes about 40% lanthanum oxide, about 25% beryllium oxide, and about 35% calcium oxide.

15. The method of claim 14, wherein the rare earth metal oxide feedstock is provided into the molten oxide electrolyte to maintain the rare earth metal oxide near its saturation concentration in the molten oxide electrolyte.

16. A method comprising:
  providing a molten oxide electrolytic cell including a container, an anode, and a current collector;
  disposing a molten oxide electrolyte within the container and in ion conducting contact with the anode and the current collector, wherein the electrolyte comprises a mixture of at least one alkaline earth oxide and at least one rare earth oxide;
  providing a metal oxide feedstock comprising at least one target metal species into the molten oxide electrolyte, wherein the target metal is a rare earth metal or beryllium and the metal oxide feedstock includes a rare earth metal oxide or beryllium oxide, and wherein the rare earth metal oxide or beryllium oxide feedstock is provided into the molten oxide electrolyte to maintain the rare earth metal oxide or beryllium oxide concentration in the molten electrolyte;
  applying a current between the anode and the current collector, thereby reducing the target metal species to form at least one molten target metal in the container; and
  removing at least a portion of the molten target metal from the container, wherein the molten target metal comprises the rare earth metal or beryllium.

17. The method of claim 16, wherein the electrolyte comprises about 30% to about 50% beryllium oxide, 0% to about 85% lanthanum oxide, 0% to about 85% cerium oxide, with the balance being calcium oxide.

18. The method of claim 16, where the target metal comprises an alloy of the target metal and at least one of hafnium, boron, iron, copper, nickel, aluminum, zirconium, and titanium.

* * * * *